United States Patent
Arai et al.

(10) Patent No.: US 7,267,642 B2
(45) Date of Patent: Sep. 11, 2007

(54) AUTOMATIC TOOL CHANGING DEVICE AND WORKING MACHINE

(75) Inventors: Takao Arai, Uji (JP); Takeshi Momochi, Numazu (JP); Yukio Teshima, Gotemba (JP); Hidemi Yoshino, Numazu (JP); Norio Yamanishi, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/475,911

(22) Filed: Jun. 28, 2006

(65) Prior Publication Data
US 2007/0004572 A1  Jan. 4, 2007

(30) Foreign Application Priority Data
Jun. 30, 2005 (JP) ............................. 2005-192112

(51) Int. Cl.
*B23Q 3/157* (2006.01)
*B23Q 11/08* (2006.01)

(52) U.S. Cl. .................. 483/3; 483/36; 483/51; 483/52; 483/53; 483/61; 483/67; 409/232

(58) Field of Classification Search ............... 483/3, 483/2, 30–32, 36, 51–53, 54–57, 60–62, 483/65–67; 409/231–233, 239 R; 279/900
See application file for complete search history.

(56) References Cited

U.S. PATENT DOCUMENTS

| | | | | |
|---|---|---|---|---|
| 2,955,488 A * | 10/1960 | Philip et al. | ................ | 483/902 |
| 3,478,407 A * | 11/1969 | Yu et al. | ..................... | 483/902 |
| 3,680,436 A * | 8/1972 | Marsland | .................... | 409/232 |
| 3,925,878 A * | 12/1975 | Kikuchi | ........................ | 483/33 |
| 4,761,877 A * | 8/1988 | Rupp | ........................... | 483/67 |
| 4,787,134 A * | 11/1988 | Yamamoto et al. | ........... | 483/49 |
| 5,035,556 A * | 7/1991 | Lamotte et al. | ............. | 409/218 |
| 5,101,548 A * | 4/1992 | McMurtry et al. | ............ | 483/62 |
| 5,382,213 A * | 1/1995 | Kopel et al. | ................ | 279/900 |
| 5,649,887 A * | 7/1997 | Taki et al. | ..................... | 483/3 |
| 5,971,903 A * | 10/1999 | Hajdukiewicz | .............. | 483/59 |
| 6,030,326 A * | 2/2000 | Azuma et al. | ................ | 483/31 |

(Continued)

FOREIGN PATENT DOCUMENTS

DE   3208621 A1 * 9/1983

(Continued)

*Primary Examiner*—Erica Cadugan
(74) *Attorney, Agent, or Firm*—DLA Piper US LLP (57) ABSTRACT

An automatic tool changing device (30) has a tool storage device (31) with a plurality of tools stored therein, a tool chucking unit (41) and a tool unchucking unit (51) both capable of advancing/retreating between the tool storage device (31) and a tool changing position (P2), and a tool delivery mechanism (61). The tool chucking unit (41) is provided with a tool fastening mechanism (42) for fastening the tool chucking mechanism (24), and the tool unchucking unit (51) is provided with a tool loosening mechanism (52) for loosening the tool chucking mechanism (24). The tool delivery mechanism (61) delivers the tool positioned at a tool delivery position from the tool storage device into the tool fastening mechanism of the tool chucking unit so that the tool is held by the tool fastening mechanism, and delivers the tool retrieved by the tool unchucking unit from the tool unchucking unit to the tool storage device so that the tool is stored by the tool storage device.

6 Claims, 6 Drawing Sheets

U.S. PATENT DOCUMENTS

| | | | |
|---|---|---|---|
| 6,332,861 B1 * | 12/2001 | Otsuka et al. | 483/55 |
| 6,732,612 B2 * | 5/2004 | Adachi et al. | 81/13 |
| 7,144,355 B2 * | 12/2006 | Momochi et al. | 483/31 |
| 7,229,396 B2 | 6/2007 | Momochi et al. | |
| 2003/0220178 A1 * | 11/2003 | Mattes et al. | 483/51 |
| 2004/0005973 A1 * | 1/2004 | Momochi et al. | 483/31 |

FOREIGN PATENT DOCUMENTS

| | | | |
|---|---|---|---|
| DE | 19906712 A1 | | 8/2000 |
| DE | 19957217 A1 | * | 5/2001 |
| DE | 10330098 A1 | | 1/2004 |
| EP | 273834 A1 | * | 7/1988 |
| JP | 57-156141 A | * | 9/1982 |
| JP | 60-186343 A | * | 9/1985 |
| JP | 63-245346 A | * | 10/1988 |
| JP | 6-326186 A | * | 11/1994 |
| JP | 7-9213 A | * | 1/1995 |
| JP | 2000-084777 | | 3/2000 |
| JP | 2004-001157 | | 1/2004 |

* cited by examiner

AUTOMATIC TOOL CHANGING DEVICE AND WORKING MACHINE

BACKGROUND OF THE INVENTION

1. Field of the Invention

The present invention relates to an automatic tool changing device and a working machine. Specifically, the present invention relates to an automatic tool changing device for automatically changing a tool with respect to a spindle, and a working machine.

2. Description of Related Art

As an automatic tool changing device for automatically changing a tool with respect to a spindle of a machine tool, there has been known, for instance, an automatic tool changing device described in Japanese Patent Laid-Open Publication No. 2000-84777.

Such kind of automatic tool changing device has a tool magazine which can store a plurality of tools and position a tool to a predetermined tool delivery position, a rotating arm which has tool graspers at two ends thereof and is disposed between the delivery position of the tool magazine and a tool changing position in a rotatable manner, and a controller which controls a rotation operation and an advancing/retreating operation in the direction of the rotation axis of the rotating arm.

When performing a tool change, a designated tool is selected from the tool magazine, and the selected tool is positioned to the tool delivery position. At the same time, the spindle is positioned to the tool changing position. In this state, the rotating arm is rotated so that the tool graspers at two ends of the rotating arm respectively grasp the tools (which are the tool positioned to the tool delivery position and the tool mounted on the spindle). After that, the rotating arm is slid in the axial direction, rotated for 180 degrees, and slid in the axial direction, so that the tool positioned to the tool delivery position is mounted on the spindle and the tool mounted on the spindle is retrieved to the tool delivery position. In such a manner, the automatic tool change is performed.

In the conventional automatic tool changing device, when performing an automatic tool change, since the spindle has to be moved and positioned into a rotating area of the rotating arm, the automatic tool changing device has to be arranged in the vicinity of a machining area of the spindle if moving stroke of the spindle is small.

With such an arrangement, when the machining work by the spindle is performed under a machining condition in which, for instance, a lot of coolant liquid needs to be used, or a lot of chips are generated, the coolant liquid and chips will adhere on the automatic tool changing device, which may cause a failure.

To be able to arrange the machining area of the spindle and the automatic tool changing device separately from each other, the moving stroke of the spindle has to be increased, therefore the working machine itself will become large-sized and complicated, and economical disadvantage is generated.

SUMMARY OF THE INVENTION

It is a primary object of the present invention to provide an automatic tool changing device as well as a working machine, in which a machining area of the spindle and the automatic tool changing device can be arranged separately from each other without increasing the moving stroke of the spindle.

An automatic tool changing device according to an aspect of the present invention is for changing a tool with respect to a spindle which is positioned to a tool changing position and has a tool chucking mechanism at a tip end, the automatic tool changing device including: a tool storage device capable of storing a plurality of tools and positioning a tool to a predetermined tool delivery position; a tool chucking unit capable of being advanced/retreated between the tool storage device and the tool changing position, the tool chucking unit having a tool fastening mechanism for fastening the tool chucking mechanism at the tool changing position; a tool unchucking unit capable of being advanced/retreated between the tool storage device and the tool changing position, the tool unchucking unit having a tool loosening mechanism for loosening the tool chucking mechanism at the tool changing position; and a tool delivery mechanism which operates in such a manner that, when the tool chucking unit is retreated so that the tool fastening mechanism is in a position corresponding to the tool delivery position, the tool delivery mechanism delivers the tool positioned to the tool delivery position from the tool storage device to the tool fastening mechanism of the tool chucking unit so that the tool is held by the tool fastening mechanism; and when the tool unchucking unit is retreated so that the tool loosening mechanism is in a position corresponding to the tool delivery position, the tool delivery mechanism delivers the tool retrieved by the tool unchucking unit from tool unchucking unit to the tool storage device so that the tool is stored by the tool storage device.

(Tool Unchucking Operation)

The description will be started from the state where the tool is mounted on the spindle. From this state, the spindle is moved and positioned to the tool changing position, and the tool unchucking unit is also advanced to the tool changing position. After that, the spindle is moved toward the tool unchucking unit, so that the tool chucking mechanism of the spindle is retained in the tool loosening mechanism of the tool unchucking unit, and the tool chucking mechanism is loosened by the tool loosening mechanism. After that, the spindle is moved away from the tool unchucking unit, so that the tool is pulled out from the tool chucking mechanism so as to be held by the tool unchucking unit. The tool held by the tool unchucking unit is retrieved to the tool storage device through a retreating operation of the tool unchucking unit and a delivery operation of the tool delivery mechanism.

(Tool Chucking Operation)

First, the designated tool is selected from the tool storage device, and the selected tool is positioned to the tool delivery position. By means of the tool delivery mechanism, the designated tool positioned to the tool delivery position is delivered to the tool fastening mechanism of the tool chucking unit from the tool storage device and held by the tool fastening mechanism. Next, the tool chucking unit is advanced. After that, the spindle is moved toward the tool chucking unit, so that the tool chucking mechanism of the spindle is retained in the tool fastening mechanism of the tool chucking unit, and the tool chucking mechanism is fastened by the tool fastening mechanism. In other words, the designated tool is held by the tool chucking mechanism. After that, the spindle is moved away from the tool chucking unit, and the tool chucking unit is retreated. Thus the designated tool is mounted on the spindle, with which machining work is performed.

In such a manner, since the tool change is performed by advancing/retreating the tool chucking unit and the tool unchucking unit between the tool storage device and the tool changing position, the machining area of the spindle and the automatic tool changing device can be arranged separately from each other without increasing the moving stroke of the spindle. Thus the problem that the coolant liquid and chips may adhere on the automatic tool changing device, which is the disadvantage of the case where the automatic tool changing device is arranged in the vicinity of the machining area, can be solved, therefore the failure caused thereby can be eliminated.

In the aforesaid automatic tool changing device, it is preferred that the tool storage device includes a tool storage turret that detachably stores tool pots, in which the tool are stored, at a predetermined angular interval, and a rotary driving mechanism that rotates the tool storage turret and positions the designated tool to the tool delivery position.

With such an arrangement, since the tool storage device includes the tool storage turret and the rotary driving mechanism which rotates the tool storage turret, not only the structure is relatively simple, but also positioning can be performed with high accuracy, thus reducing failure.

In the aforesaid automatic tool changing device, it is preferred that the tool chucking unit can be retreated until the tool fastening mechanism reaches a position that is parallel to a rotating axis of the tool storage turret and corresponds to the tool delivery position; the tool unchucking unit can be retreated until the tool loosening mechanism reaches a position which is parallel to the rotating axis of the tool storage turret and corresponds to the tool delivery position; and the tool delivery mechanism includes a tool delivery rod movable along an axis which is parallel to the rotating axis of the tool storage turret and corresponds to the tool delivery position, and an advancing/retreating mechanism which advances/retreats the tool delivery rod along the axis.

With such an arrangement, since the tool chucking unit, the tool unchucking unit, and the tool delivery rod of the advancing/retreating mechanism are located on the axis which is parallel to the rotating axis of the tool storage turret and corresponds to the tool delivery position, the device as a whole can be made slim. Further, since the tool delivery rod of the advancing/retreating mechanism only needs to be moved in the direction of the axis which is parallel to the rotating axis of the tool storage turret and corresponds to the tool delivery position, the operation can be smoothly performed.

In the aforesaid automatic tool changing device, it is preferred that the tool chucking unit and the tool unchucking unit are arranged at the positions shifted from each other in the direction of the axis which is parallel to the rotating axis of the tool storage turret and corresponds to the tool delivery position, the tool chucking unit and the tool unchucking unit being capable of being advanced/retreated in the same direction perpendicular to the direction of the axis.

With such an arrangement, since the tool chucking unit and the tool unchucking unit are arranged at the positions shifted from each other in the axial direction and are capable of being advanced/retreated in the same direction perpendicular to the axial direction, the width dimension of the device can be reduced. Thus the device as a whole can be made compact.

In the aforesaid automatic tool changing device, it is preferred that the tool chucking mechanism includes a collet chuck mounted on the spindle, and a nut member for fastening the collet chuck; the tool fastening mechanism includes a rotation mechanism for rotating the nut in a direction so that the nut is fastened; and the tool loosening mechanism includes a rotation mechanism for rotating the nut in a direction so that the nut is loosened.

With such an arrangement, since the tool chucking mechanism fastens and loosens the collet chuck through the rotation operation of the nut member, the structure can be simplified.

A working machine according to another aspect of the present invention has the aforementioned automatic tool changing device, and a working machine main body having a machining area space where the spindle can be moved, in which the machining area space has a window on a wall adjacent to the automatic tool changing device, the tool chucking unit and the tool unchucking unit of the automatic tool changing device can project into the machining area space through the window, and the window is provided with a shutter which can be opened and closed.

With such an arrangement, since the machining area space is formed with a window on a wall adjacent to the automatic tool changing device, and since the window is provided with a shutter which can open and close, the coolant liquid and chips from the machining area space will not adhere on the automatic tool changing device when the shutter is closed. Further, when the shutter is opened, the tool chucking unit and the tool unchucking unit can project into the machining area space through the window, therefore the tool change can be smoothly performed.

DETAILED DESCRIPTION OF PREFERRED EMBODIMENT(S)

An embodiment of the present invention will be described below with reference to the attached drawings.

Figure 1:
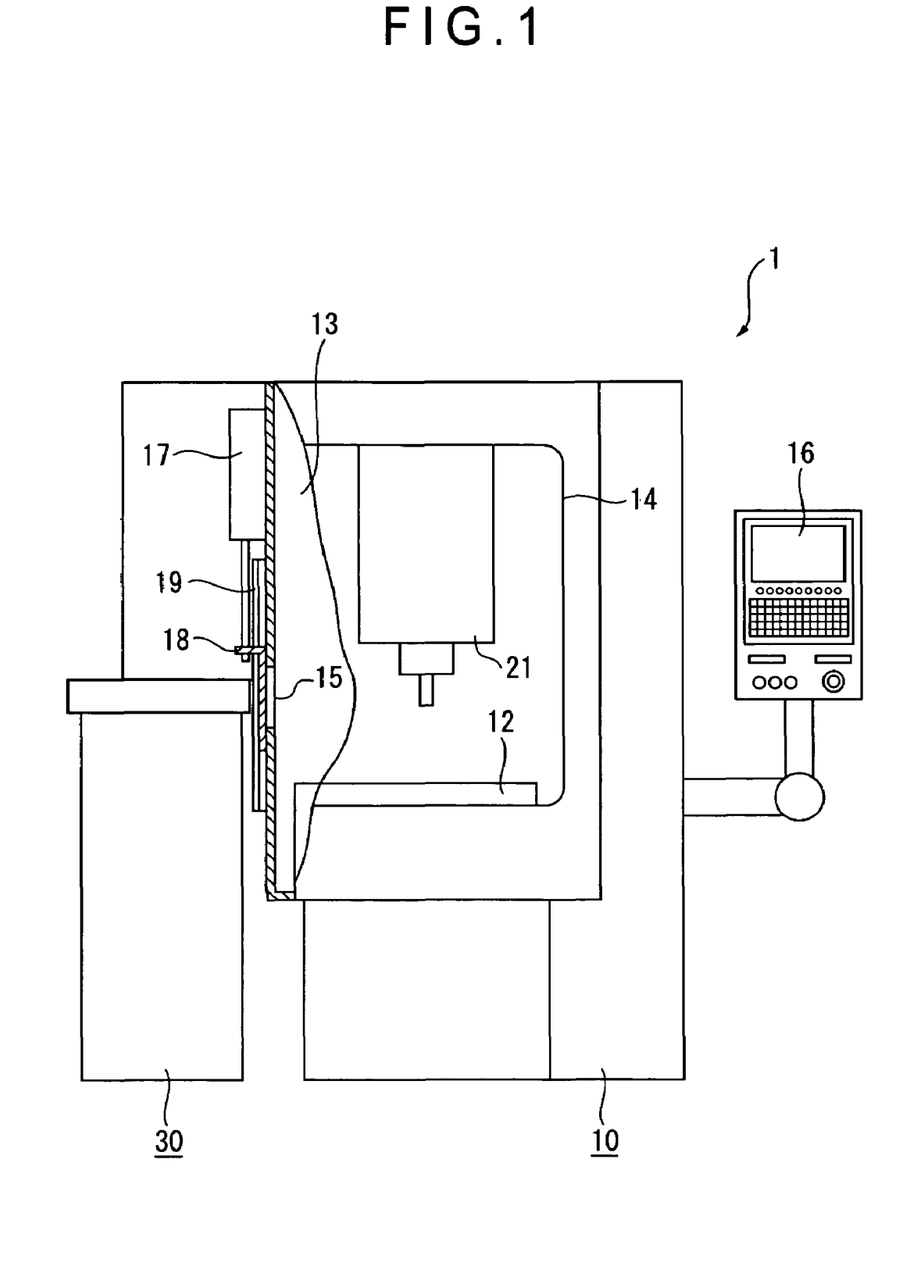
FIG. 1 is a front elevational view showing a working machine in an embodiment of the present invention.

<Description of FIG. 1>

FIG. 1 shows a working machine equipped with an automatic tool changing device of the present invention. The working machine 1 includes a working machine body 10 and an automatic tool changing device 30 arranged adjacent to the working machine body 10.

The working machine body 10 is provided with a table 12 in which a workpiece is mounted, and a machining area space 13 where a spindle head 21 can relatively move in three dimensional directions (namely, in back-and-forth, side-to-side, and up-and-down directions). The front face of the working machine body 10 is provided with an observation window 14 through which the machining area space 13 can be observed. Provided on the left side wall (the side wall adjacent to the automatic tool changing device 30) is a window 15, through which a tool chucking unit 41 (which will be mentioned later) and a tool unchucking unit 51 (which will be mentioned later) of the automatic tool changing device 30 can be projected into the machining area space 13. Provided on the right side wall is an operation panel 16.

The window 15 is provided with a shutter 18 via a guide rail 19, the shutter 18 being slid by a cylinder 17. In other words, the window 15 can be opened/closed by the shutter 18.

Figure 2:
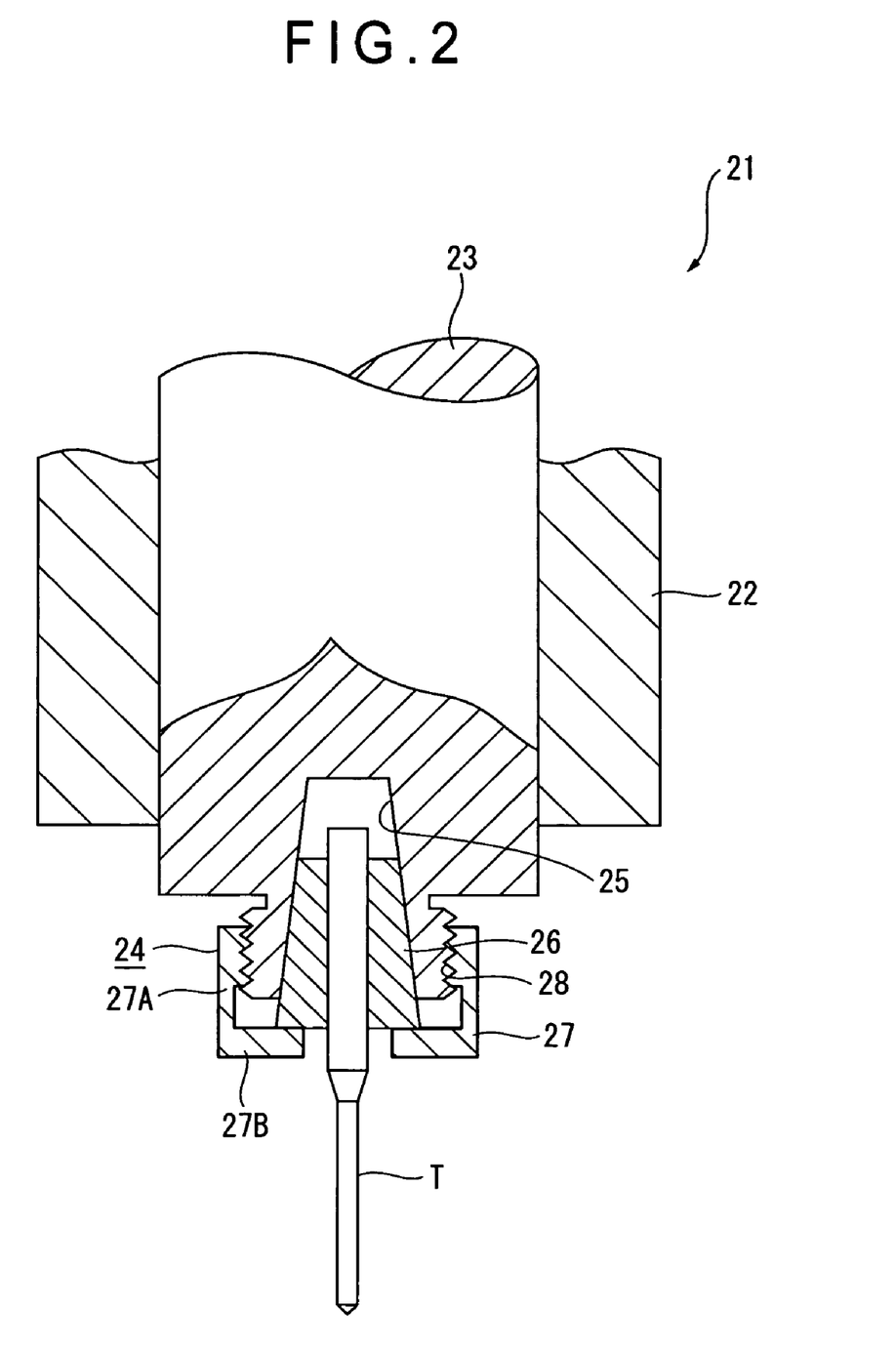
FIG. 2 is a cross section showing a spindle head in the aforesaid embodiment.

<Description of FIG. 2>

FIG. 2 shows the spindle head 21. The spindle head 21 includes a bearing member 22, a spindle 23 rotatably supported by the bearing member 22 via an air static pressure bearing (not shown), and a tool chucking mechanism 24 provided at a tip end of the spindle 23.

The tool chucking mechanism 24 includes a taper hole 25 formed at the tip end face of the spindle 23, a collet chuck 26 mounted in the taper hole 25, and a nut member 27 which fastens and loosens the collet chuck 26. The nut member 27 includes a nut portion 27A formed on an outer circumference of the taper hole 25 at the tip end of the spindle 23 and engaged with an externally threaded portion 28, and a bag-shaped pressing portion 27B provided at one end of the nut portion 27A for pressing the collet chuck 26 from the downside. Thus, when screwing the nut member 27 (in a clockwise direction), since the collet chuck 26 is inserted into the taper hole 25, a tool T can be held. While when turning the nut member 27 in the reverse direction, since the fastening caused by the collet chuck 26 is loosened, the tool T can be removed. Though not being shown in the drawings, a spindle rotation regulating mechanism is provided for regulating the rotation of the spindle 23 when fastening/loosening the tool chucking mechanism 24.

Figure 3:
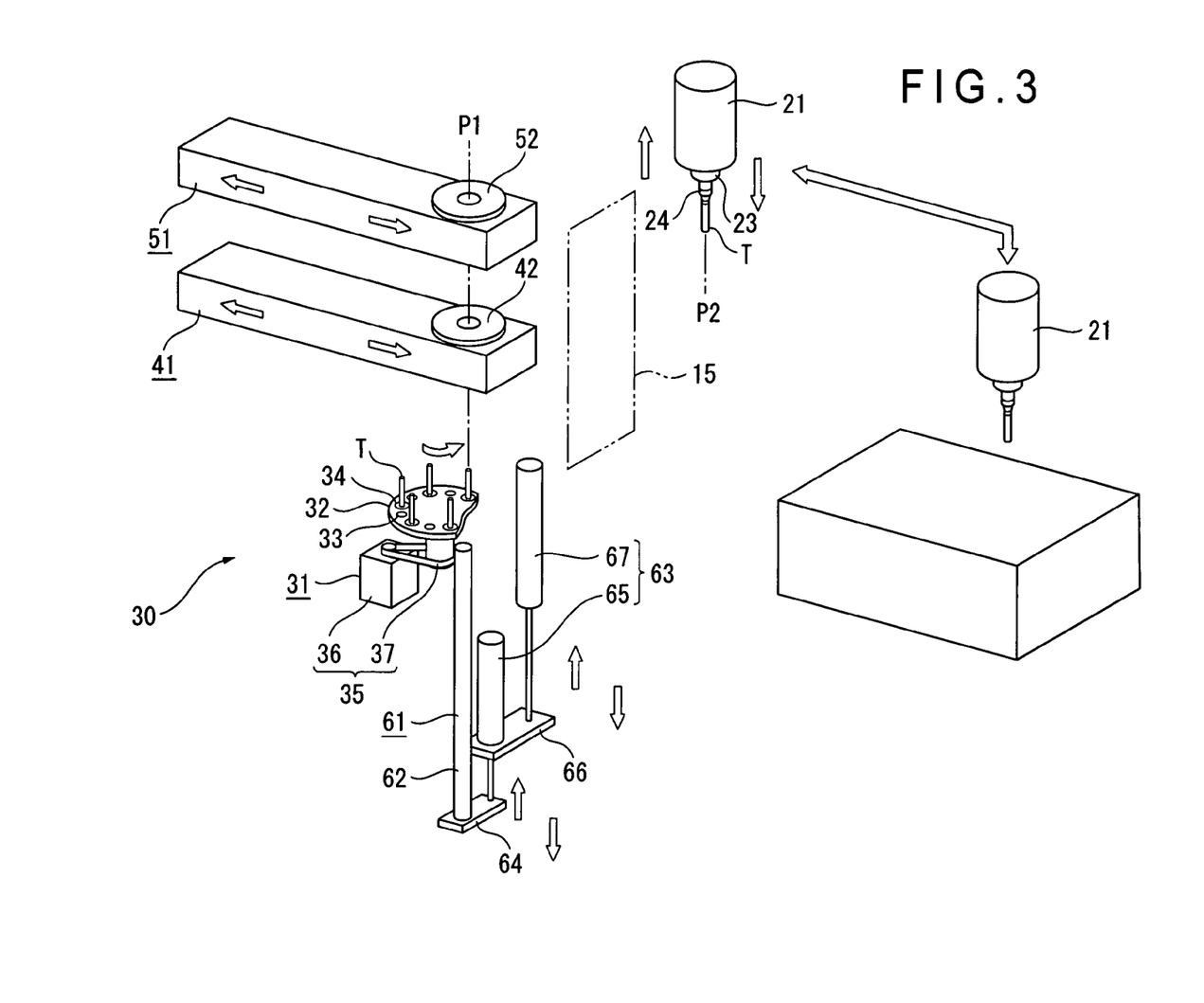
FIG. 3 is an exploded perspective view showing an automatic tool changing device in the aforesaid embodiment.
Figure 4:
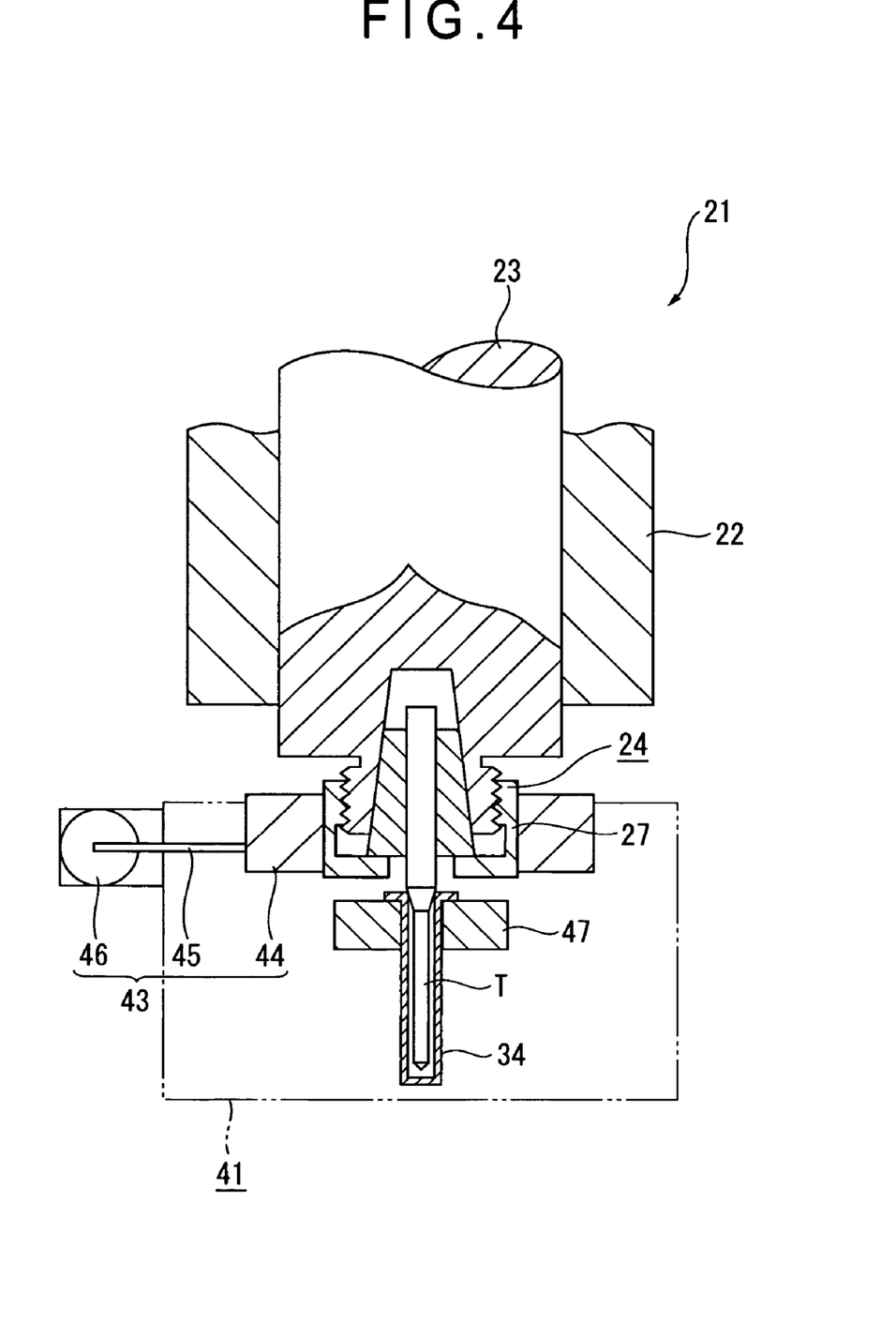
FIG. 4 is a cross section showing a tool fastening mechanism of the automatic tool changing device in the aforesaid embodiment.

<Description of FIG. 3 and FIG. 4>

FIG. 3 shows the automatic tool changing device 30. The automatic tool changing device 30 includes a tool storage device 31 capable of storing a plurality of tools T and positioning the tools to a predetermined tool delivery position, the tool chucking unit 41, the tool unchucking unit 51, and a tool delivery mechanism 61.

The tool storage device 31 includes a tool storage turret 32 that detachably stores tool pots 34, in which the tools T are stored, at a predetermined angular interval, and a rotary driving mechanism 35 that rotates the tool storage turret 32 and positions the designated tool T to a tool delivery position. The tool storage turret 32 is formed with storage holes 33 at predetermined angular positions on the same circumference, the storage holes 33 detachably storing the tool pots 34 in which the tools T are stored. The rotary driving mechanism 35 includes a motor 36, and a belt 37 which is put around an output shaft of the motor 36 and a shaft of the tool storage turret 32.

Driven by a cylinder (not shown), the tool chucking unit 41 can advance/retreat between the tool delivery position P1 of the tool storage device 31 and a tool changing position P2 in the machining area space 13. The tool chucking unit 41 has a tool fastening mechanism 42 for fastening the tool chucking mechanism 24 at the tool changing position P2. In other words, the tool fastening mechanism 42 can be advanced/retreated between a position which is parallel to the rotating axis of the tool storage turret 32 and corresponds to the tool delivery position P1 and the tool changing position P2.

As shown in FIG. 4, the tool fastening mechanism 42 includes, from upper to lower, a rotation mechanism 43 for rotating the nut member 27 in a direction for fastening the nut member 27, and a holder 47 for holding the tool pot 34 in which the tool T is stored. The rotation mechanism 43 includes a nut storage member 44 which stores the nut member 27 and can be rotated, a one-direction rotation mechanism (not shown), such as a ratchet mechanism, for allowing the nut storage member 44 only to be rotated in one direction (the direction in which the nut member 27 is fastened), and a cylinder 46 which rotates the nut member 27 in the one direction, the cylinder 46 being connected with the nut storage member 44 via a lever 45. The holder 47 is made of an elastic material such as a rubber so that the tool pot 34 can be elastically held. The holder 47 has a holding hole at its center for holding the tool pot 34.

Driven by a cylinder (not shown), the tool unchucking unit 51 can be advanced/retreated between the tool delivery position P1 of the tool storage device 31 and the tool changing position P2 in the machining area space 13. The tool unchucking unit 51 has a tool loosening mechanism 52 for loosening the tool chucking mechanism 24 at the tool changing position P2. In other words, the tool loosening mechanism 52 is advanced/retreated between a position which is parallel to the rotating axis of the tool storage turret 32 and corresponds to the tool delivery position P1 and the tool changing position P2.

Though not shown in the drawings, the tool loosening mechanism 52 has a rotation mechanism and a one-direction rotation mechanism for rotating the nut member 27 so that the nut member 27 is loosened, and a holder for holding the retrieved tool T. The rotation mechanism has basically the same construction as indicated in FIG. 4, therefore the description thereof will be omitted.

Incidentally, the tool chucking unit 41 and the tool unchucking unit 51 are arranged at the positions shifted from each other in the direction of the axis which is parallel to the rotating axis of the tool storage turret 32 and corresponds to the tool delivery position P1, the units 41, 51 being advanced/retreated in the same direction perpendicular to the direction of the axis.

In the state where the tool chucking unit 41 is retreated so that the tool fastening mechanism 42 is in a position corresponding to the tool delivery position P1, the tool delivery mechanism 61 delivers the tool T positioned at the tool delivery position P1 from the tool storage device 31 into the tool fastening mechanism 42 of the tool chucking unit 41 so that the tool T is held by the tool fastening mechanism 42. While in the state where the tool unchucking unit 51 is retreated so that the tool loosening mechanism 52 is in a position corresponding to the tool delivery position P1, the tool delivery mechanism 61 delivers the tool T retrieved by the tool unchucking unit 51 from tool unchucking unit 51 to the tool storage device 31 so that the tool T is stored by the tool storage device 31.

Specifically, the tool delivery mechanism 61 includes a tool delivery rod 62 movable along the axis which is parallel to the rotating axis of the tool storage turret 32 and corresponds to the tool delivery position P1, and an advancing/retreating mechanism 63 which advances/retreats the tool delivery rod 62 along the axis. The advancing/retreating mechanism 63 includes a first cylinder 65 connected to the tool delivery rod 62 via a connection plate 64, and a second cylinder 67 connected to the first cylinder 65 via a connection plate 66.

Figure 5:
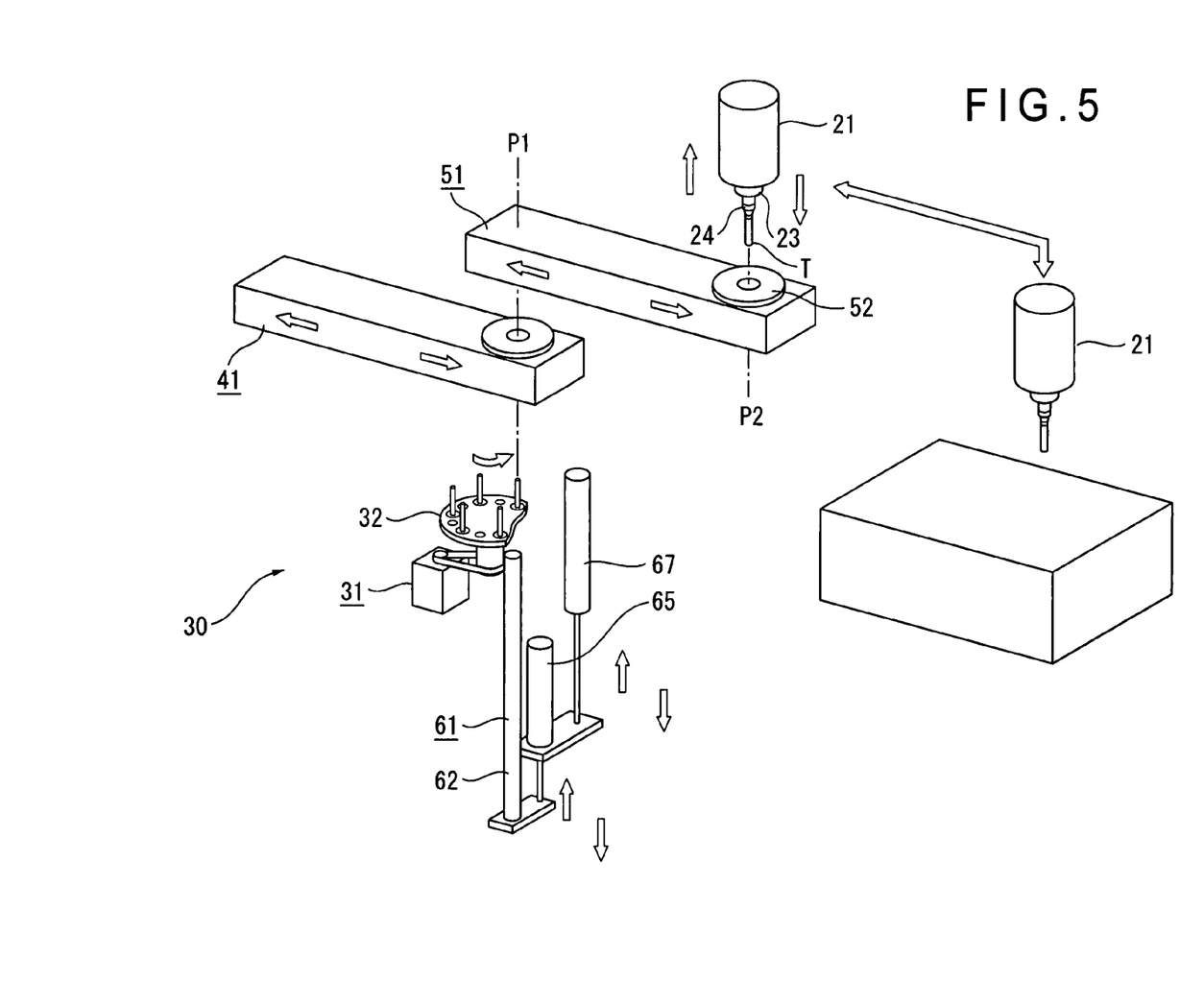
FIG. 5 is an illustration explaining a tool unchucking operation of the automatic tool changing device in the aforesaid embodiment.

<Description of FIG. 5>

(Tool Unchucking Operation)

The description will be started from the state where the tool T is mounted on the spindle 23. From this state, the spindle head 21 (the spindle 23) is moved and positioned to the tool changing position P2, and the tool unchucking unit 51 is also advanced to the tool changing position P2. Next, the spindle head 21 (the spindle 23) is moved toward the tool unchucking unit 51, so that the tool chucking mechanism 24 of the spindle head 21 (the spindle 23) is held by the tool loosening mechanism 52 of the tool unchucking unit 51, and the tool chucking mechanism 24 is loosened by the tool loosening mechanism 52. After that, the spindle head 21 (the spindle 23) is moved away from the tool unchucking unit 51, so that the tool T is pulled out from the tool chucking mechanism 24 so as to be held by the tool unchucking unit 51.

The tool T held by the tool unchucking unit 51 is retrieved to the tool storage device 31 through a retreating operation of the tool unchucking unit 51 and a delivery operation of the tool delivery mechanism 61.

First, the tool unchucking unit 51 is retreated to its original position. At the same time, a tool storage turret 32 of the tool storage device 31 is rotated so that the tool pot 34 for the used tool is positioned to the tool delivery position P1. Next, the tool delivery rod 62 is raised by the driving of the first and second cylinders 65, 67 of the tool delivery mechanism 61. Since the tool delivery rod 62 is raised, the tool pot 34 for the used tool is carried into the tool loosening mechanism 52 of the tool unchucking unit 51 from the tool storage device 31.

Thus, the used tool T is retrieved to the tool pot 34 for the used tool carried into the tool loosening mechanism 52. After that, the tool delivery rod 62 is descended by the driving of the first and second cylinders 65, 67 of the tool delivery mechanism 61, and the tool pot 34 for the used tool which stores the used tool T is stored in the tool storage turret 32 of the tool storage device 31. Thereby the tool unchucking operation is finished.

Figure 6:
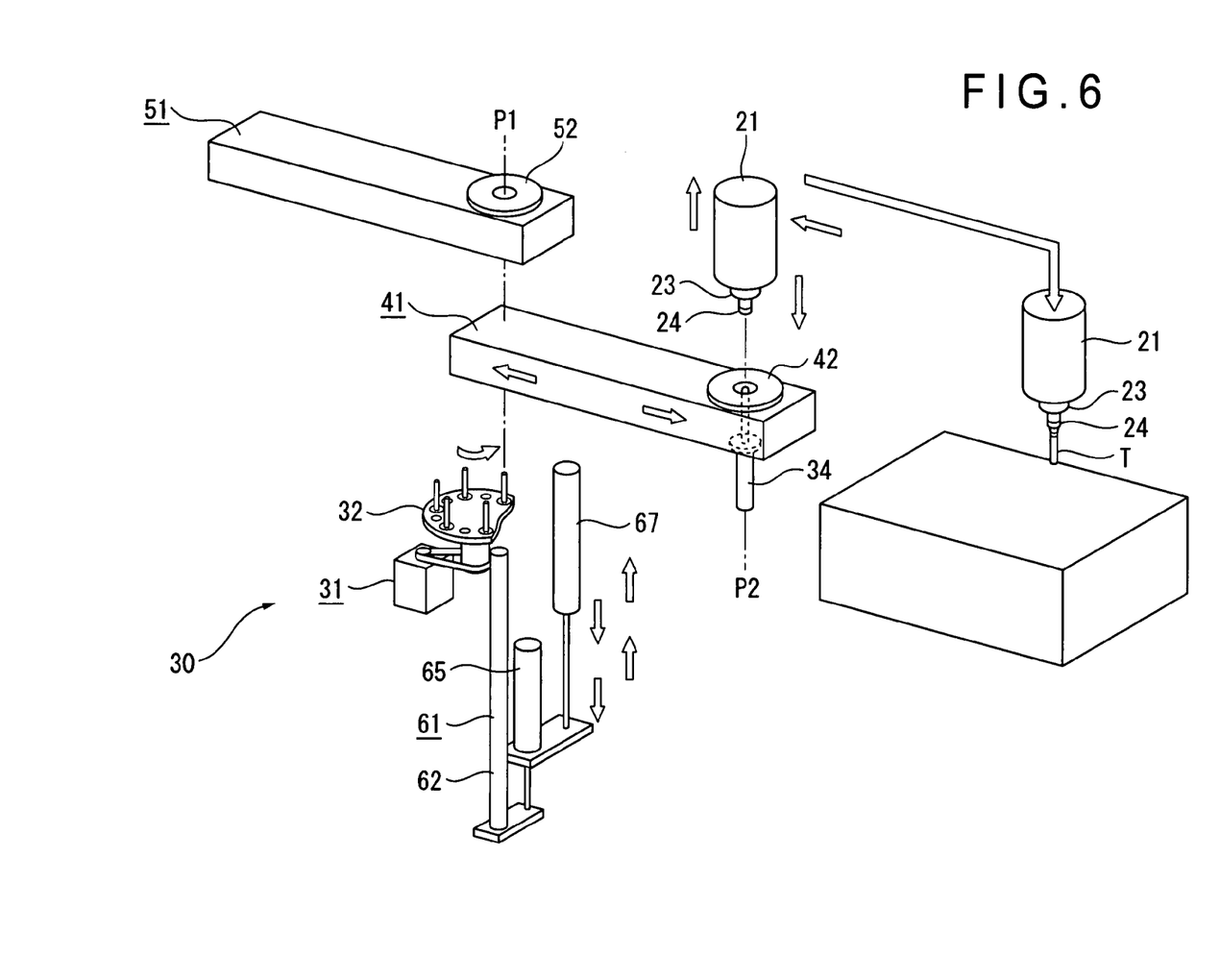
FIG. 6 is an illustration explaining a tool chucking operation of the automatic tool changing device in the aforesaid embodiment.

<Description of FIG. 6>

(Tool Chucking Operation)

First, the designated tool T is selected from the tool storage device 31, and the selected tool T is positioned to the tool delivery position P1 by the rotation of the tool storage turret 32. By means of the tool delivery mechanism 61, the tool T positioned to the tool delivery position P1 is delivered to the tool fastening mechanism 42 of the tool chucking unit 41 from the tool storage device 31 and held by the tool fastening mechanism 42. In other words, the tool delivery rod 62 is raised by the driving of the second cylinder 67 of the tool delivery mechanism 61. Since the tool delivery rod 62 is raised, the designated tool T is delivered from the tool storage device 31 to the tool fastening mechanism 42 of the tool chucking unit 41 so that the designated tool T is held by the tool fastening mechanism 42. After that, the tool delivery rod 62 is descended by the driving of the second cylinder 67 of the tool delivery mechanism 61.

Next, the spindle head 21 (the spindle 23) is moved and positioned to the tool changing position P2, and at the same time, the tool chucking unit 41 is advanced and positioned just under the spindle 23. After that, the spindle head 21 (the spindle 23) is moved toward the tool chucking unit 41, so that the tool chucking mechanism 24 of the spindle 23 is held by the tool fastening mechanism 42 of the tool chucking unit 41, and the tool chucking mechanism 24 is fastened by the tool fastening mechanism 42. In other words, the designated tool T is held by the tool chucking mechanism 24. After that, the spindle 23 is moved away from the tool chucking unit 41. Thus the designated tool T is mounted on the spindle 23, with which the machining work is performed.

The tool pot 34 held by the tool chucking unit 41 is retrieved to the tool storage device 31 through a retreating operation of the tool chucking unit 41 and a delivery operation of the tool delivery mechanism 61.

First, the tool chucking unit 41 is retreated to its original position. Next, the tool delivery rod 62 is raised by the driving of the second cylinder 67 of the tool delivery mechanism 61. Since the tool delivery rod 62 is raised, the emptied tool pot 34 is retrieved to the tool delivery rod 62. After that, the tool delivery rod 62 is descended by the driving of the second cylinder 67 of the tool delivery mechanism 61, and the emptied tool pot 34 is stored in the tool storage turret 32 of the tool storage device 31. Thus the tool chucking operation is finished.

In the present embodiment, since the tool change is performed by advancing/retreating the tool chucking unit 41 and the tool unchucking unit 51 between the tool storage device 31 and the tool changing position P2, the machining area of the spindle 23 and the automatic tool changing device 30 can be arranged separately from each other without increasing the moving stroke of the spindle 23. Thus the problem that the coolant liquid and chips will adhere on the automatic tool changing device can be solved, which is the disadvantage of the case where the automatic tool changing device 30 is arranged in the vicinity of the machining area, and therefore the failure caused thereby can be eliminated.

Further, the present invention is widely applicable since it can be applied to any working machines having a spindle (such as a spindle of a collet type machine) requiring substantially no modification to basic structure of the spindle 23 and working machine body 10. Particularly, since the spindle 23 of the working machine body 10 is provided with no mechanism for applying the automatic tool changing device, the performance of the spindle 23 can be maintained as before. This merit is especially great to a recent high speed spindle, or an ultra-high speed spindle (which has a rotating speed of 100,000 rpm or higher), from the view point of preventing vibration of the spindle.

<Modifications>

It is to be understood that the present invention is not limited to the embodiment described above, and various modifications and improvements can be made as long as the objects of the present invention can be achieved.

For instance, in the embodiment described above, though the collet chuck 26 is used in the tool chucking mechanism 24 which retains the tool T to the spindle 23, the arrangement is not limited thereto. In other words, the tool chucking mechanism 24 can have any other arrangement as long as the tool T can be easily changed with respect to the spindle 23. In such a case, the tool fastening mechanism 42 of the tool chucking unit 41 and the tool loosening mechanism 52 of the tool unchucking unit 51 should have arrangements corresponding to the arrangement of the tool chucking mechanism 24.

The priority application Number JP2005-192112 upon which this patent application is based is hereby incorporated by reference.

What is claimed is:

1. An automatic tool changing device for changing a tool with respect to a spindle which is positioned to a tool changing position and has a tool chucking mechanism at a tip end, the automatic tool changing device comprising:
 a tool storage device capable of storing a plurality of tools and positioning a tool to a predetermined tool delivery position;

a tool chucking unit capable of being advanced and retreated between the tool storage device and the tool changing position, the tool chucking unit having a tool fastening mechanism for fastening the tool chucking mechanism at the tool changing position;

a tool unchucking unit spaced from the tool chucking unit in the direction of the rotary axis of the spindle and capable of being advanced and retreated between the tool storage device and the tool changing position, the tool unchucking unit having a tool loosening mechanism for loosening the tool chucking mechanism at the tool changing position; and a tool delivery mechanism including a tool delivery rod movable relative to the tool chucking unit and to the tool unchucking unit along a rod axis parallel to the spindle axis and which operates in such a manner that, when the tool chucking unit is retreated so that the tool fastening mechanism is in a position corresponding to the tool delivery position, the tool delivery rod moves along the rod axis to deliver the tool positioned to the tool delivery position from the tool storage device to the tool fastening mechanism of the tool chucking unit so that the tool is held by the tool fastening mechanism; and when the tool unchucking unit is retreated so that the tool loosening mechanism is in a position corresponding to the tool delivery position, the tool delivery rod moves along the rod axis to deliver the tool retrieved by the tool unchucking unit from the tool unchucking unit to the tool storage device so that the tool is stored by the tool storage device.

2. The automatic tool changing device according to claim 1, wherein the tool storage device comprises a tool storage turret that detachably stores tool pots, in which the tools are stored, at a predetermined angular interval, and a rotary driving mechanism that rotates the tool storage turret and positions a designated tool to the tool delivery position.

3. The automatic tool changing device according to claim 2, wherein the tool chucking unit can be retreated until an axis of the tool fastening mechanism reaches a position that is parallel to a rotating axis of the tool storage turret and corresponds to the tool delivery position;

the tool unchucking unit can be retreated until an axis of the tool loosening mechanism reaches a position which is parallel to the rotating axis of the tool storage turret and corresponds to the tool delivery position; and the rod axis of the tool delivery rod is parallel to the rotating axis of the tool storage turret and corresponds to the tool delivery position, and the tool delivery mechanism also includes an advancing and retreating mechanism which advances and retreats the tool delivery rod along the rod axis.

4. The automatic tool changing device according to claim 2, wherein the tool chucking unit and the tool unchucking unit are arranged at positions shifted from each other in the direction of an axis which is parallel to the rotating axis of the tool storage turret, which axis corresponds to the tool delivery position, the tool chucking unit and the tool unchucking unit being capable of being advanced and retreated in the same direction perpendicular to the direction of the axis which is parallel to the rotating axis of the tool storage turret.

5. The automatic tool changing device according to claim 1, wherein the tool chucking mechanism includes a collet chuck mounted on the spindle, and a nut member for fastening the collet chuck;

the tool fastening mechanism includes a rotation mechanism for rotating the nut in a direction so that the nut is fastened; and the tool loosening mechanism includes a rotation mechanism for rotating the nut in a direction so that the nut is loosened.

6. A working machine having an automatic tool changing device for changing a tool with respect to a spindle which is positioned to a tool changing position and has a tool chucking mechanism at a tip end, and a working machine main body having a machining area space where the spindle can be moved, wherein the automatic tool changing device further comprises:

a tool storage device capable of storing a plurality of tools and positioning a tool to a predetermined tool delivery position;

a tool chucking unit capable of being advanced and retreated between the tool storage device and the tool changing position, the tool chucking unit having a tool fastening mechanism for fastening the tool chucking mechanism at the tool changing position;

a tool unchucking unit spaced from the tool chucking unit in the direction of the rotary axis of the spindle and capable of being advanced and retreated between the tool storage device and the tool changing position, the tool unchucking unit having a tool loosening mechanism for loosening the tool chucking mechanism at the tool changing position; and a tool delivery mechanism including a tool delivery rod movable relative to the tool chucking unit and to the tool unchucking unit along a rod axis parallel to the spindle axis and which operates in such a manner that, when the tool chucking unit is retreated so that the tool fastening mechanism is in a position corresponding to the tool delivery position, the tool delivery rod moves along the rod axis to deliver the tool positioned to the tool delivery position from the tool storage device to the tool fastening mechanism of the tool chucking unit so that the tool is held by the tool fastening mechanism; and when the tool unchucking unit is retreated so that the tool loosening mechanism is in a position corresponding to the tool delivery position, the tool delivery rod moves along the rod axis to deliver the tool retrieved by the tool unchucking unit from the tool unchucking unit to the tool storage device so that the tool is stored by the tool storage device, and wherein the machining area space has a window on a wall adjacent to the automatic tool changing device, the tool chucking unit and the tool unchucking unit of the automatic tool changing device can project into the machining area space through the window, and the window is provided with a shutter which can be opened and closed.

* * * * *